Feb. 23, 1932.  R. THOMSON  1,846,501
THREAD CUTTING TOOL
Filed May 23, 1929   2 Sheets-Sheet 2
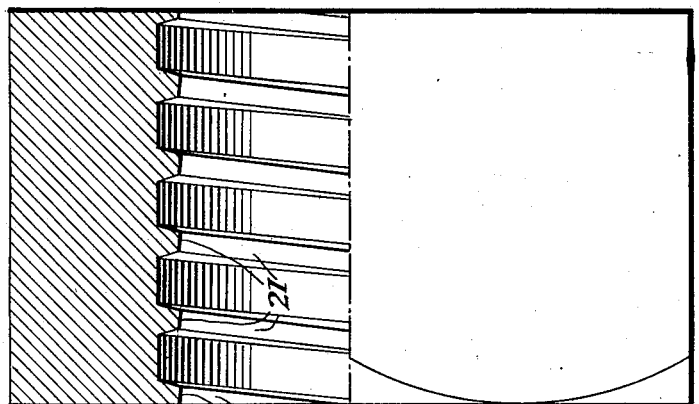
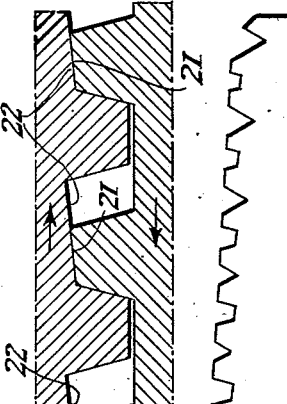
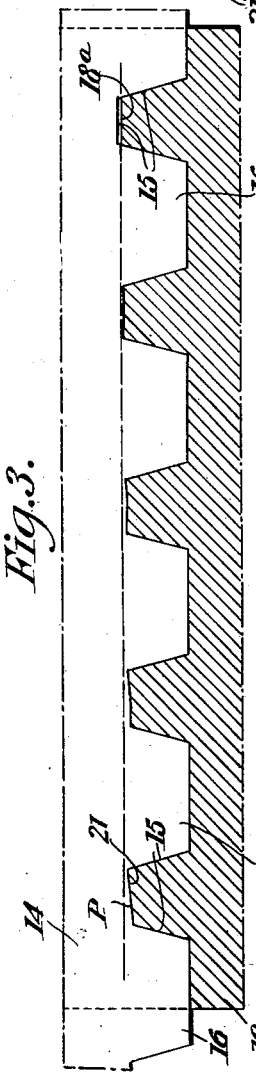
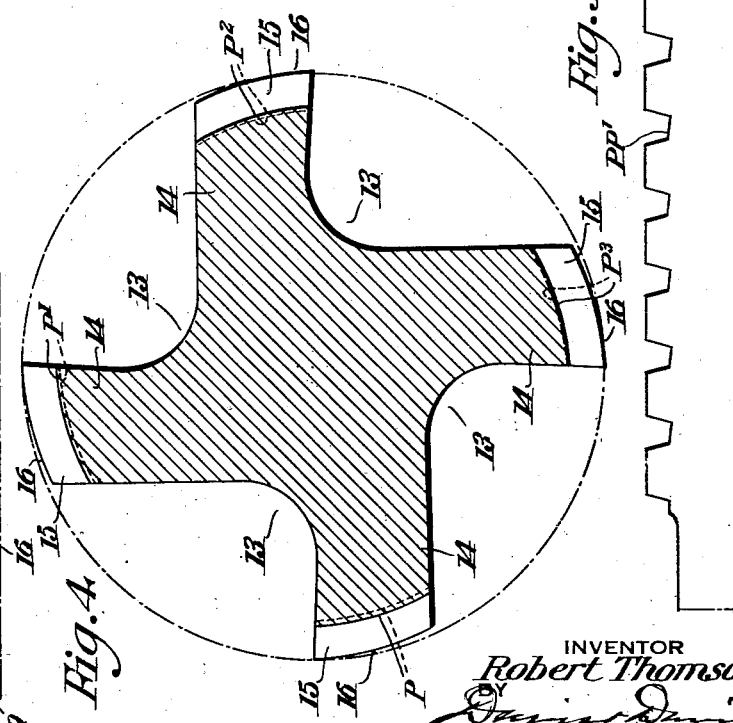
INVENTOR
Robert Thomson
ATTORNEYS Patented Feb. 23, 1932

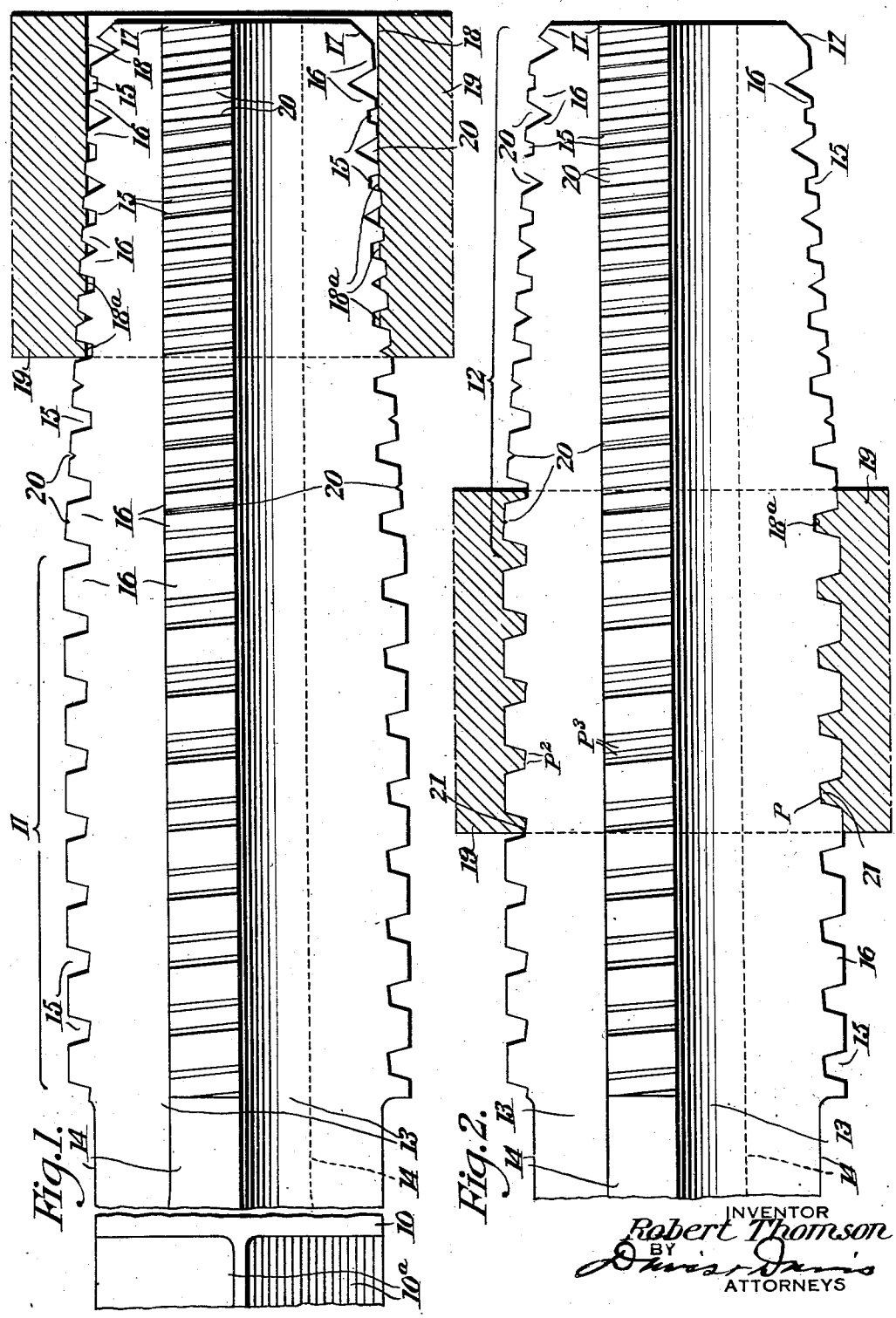

1,846,501

UNITED STATES PATENT OFFICE

ROBERT THOMSON, OF NEWARK, NEW JERSEY, ASSIGNOR TO DARDELET THREADLOCK CORPORATION, OF NEW YORK, N. Y., A CORPORATION OF DELAWARE

THREAD CUTTING TOOL

Application filed May 23, 1929. Serial No. 365,387.

This invention relates to improvements in thread cutting tools and is especially adapted for embodiment in screw thread forming taps for cutting Dardelet threads, although capable of useful embodiment in taps for cutting other forms of internal threads and in other types of thread cutters, such as chasers, and especially chasing cutters for forming internal threads.

One important object of the invention is to provide a thread cutting tool, and particularly a tap, which will cut a thread with great accuracy. Another important object of the invention is to provide a thread cutting tool, and particularly a tap, for cutting accurate and smooth Dardelet locking threads. A further object of the invention is to provide a tap constructed so as to efficiently distribute the work and stresses when the tap is in use and reduce the liability of choking of the flutes with cut metal. Still another important object of the invention is to provide a tap for cutting internal Dardelet threads which will act on the crest of the thread rib of the nut or other part being threaded only after the thread rib has been fully developed or substantially fully developed.

Other features and advantages of the invention will appear from the following description in detail of the two forms of improved taps shown in the accompanying drawings, in which Fig. 1 is a fragmentary side view of a tap, embodying the invention, showing a nut blank being acted on by the entering end of the tap;

Fig. 2 is a similar view showing the tap acting on the crest of the nut thread rib;

Fig. 3 is a fragmentary view on an enlarged scale showing the nut blank and the lowermost land of the tap (as viewed in Fig. 2) in the same relative positions as in Fig. 2, more clearly showing the nut thread rib crest trimming or finishing action of the tap, the broken line adjacent the bases of the teeth on the land being parallel with the tap axis;

Fig. 4 is a detail view of the tap broken away through the highest part of the tap thread groove in the non-tapered portion of the body of the tap through one turn of the groove to show the first groove section of perfect profile and the three preceding groove sections of the crest-finishing series of groove sections of the tap;

Fig. 5 is a side view of one land of a tap similar to that shown in Figs. 1 to 4 except for a slightly modified form of tap thread groove, the dot-and-dash line along the bottom of this view being parallel with the tap axis;

Fig. 6 is a side view, partly in section, of a Dardelet nut threaded by the tap; and Fig. 7 is a fragmentary longitudinal sectional view showing a Dardelet nut thread in self-holding or locked relation with the thread of a Dardelet bolt.

The tap, in the embodiment shown, has a cylindrical shank portion 10, preferably long enough to receive several finished nuts and squared at its outer end to provide the usual attachment portion 10ª, and a fluted body formed with the threads of the tap and comprising a cylindrical or non-tapered portion 11 and a tapered portion 12. The tap body preferably has four flutes 13 leaving four lands 14 cut by the interrupted groove 15 of the tap thread to leave the helical series of thread groove developing cutting teeth 16 which form the interrupted rib of the tap thread. Flutes 13 interrupt both the bottom of groove 15 and rib of the tap thread.

The top surfaces of the lands for a short distance back from the entering end of the tap are preferably ground to form a narrow interrupted conoidal surface 17, having a large taper (about 45°), at the entering end of the tap which will facilitate entrance of the tap into the original or pre-formed cylindrical bore 18 of the nut blank 19 and centering of the tap and blank with respect to each other. The foregoing features of construction are all well known.

In the improved tap shown in the drawings provision is made for distributing the work and strains in cutting a thread, for causing metal removed by the tap in developing a thread groove to break up into small chips to avoid choking and/or breaking of the tap, for trimming or finishing the crest of a thread rib entirely (or substantially entirely) after complete development of the groove of the thread, and for forming a thread crest surface sloping toward the axial line of the thread entirely across the top of the thread rib. The novel features of construction whereby the foregoing ends are accomplished will now be described.

All the teeth 16 on the portion 11 of the tap are the same height, while the teeth 16 on portion 12 of the tap get progressively lower toward the entering end of the tap, the tops of all the teeth of the tap preferably being relieved toward their rear or following edges. The tops of the teeth, beginning at the entering end of the tap are grooved or channeled from front to rear, a chip breaking groove 20 being formed in the tops of the teeth, but terminating short of the last tooth of the tap. Preferably this groove terminates at or about the junction of portions 11 and 12 of the tap body, is deepest in the leading tooth, and gets constantly more shallow until it fades out or disappears, as shown. The depth of the vanishing groove 20 at the smaller end of the tap, which groove may be of the V-shape shown in cross section, or of any other desired form, is made such that it exceeds the depth of cut of the teeth for the major portion of its length, the bottom of the groove preferably crossing the projection of bore 18 to be threaded (or the calculated depth of cut line of the groove cutting teeth) near the inner end of the tapered portion of the tap, as shown, so that, at least until the nut thread groove has been cut or developed the greater portion of its depth each of the cutting teeth will be divided by the groove into two independent cutting sections. Groove 20 is preferably very wide relatively to the width of the tops of the leading teeth as shown. The two narrow portions of metal removed by each of the leading teeth will break up into small chips, and will not roll or ball in the flutes with the resultant injurious choking and breaking effects of taps wherein the leading teeth cut their full width at the top.

The bottom of thread groove 15 on the lands forms the interrupted root surface of the tap thread or the tops of the interdental portions of the lands. The bottom of the thread groove 15 bears a constant relation to the axial line of the tap from the inner end of portion 11 adjacent the tap shank through one or more turns and then a variable relation to said line until the entering end of the tap is reached. In the construction shown the constant relationship extends through several turns of the tap thread to and including interdental portion P which is the leading interdental portion whose top corresponds with the crest profile of the thread the tap is designed to cut and whose leading top or cutting edge completes the trimming or finishes the nut thread crest to final form.

Beginning with interdental portion P' next in advance of P and extending through interdental portions $P^2$, $P^3$ and so on to the leading interdental portion at the entering end of the tap, the thread groove bottom gradually and constantly approaches the axial line of the tap. In the construction shown in Figs. 1 to 4, inclusive, the root surface of the tap thread from its inner end to and including portion P has an inward slope of six degrees relatively to the axial line of the tap toward the entering end of the tap to form a perfect binding surface 21 of this slope on the crest of the nut thread rib of the Dardelet nut shown in Figs. 6 and 7. The reduction in root diameter of the tap thread, above referred to, is effected by beginning with portion P' to constantly reduce the root diameter along a line always maintained parallel with the axial line of the tap but constantly approaching said axial line as shown in Figs. 1 to 4 and graphically illustrated in connection with one land in Fig. 3 wherein the broken line extending longitudinally of the view is parallel with the tap axis and indicates a projection of the original cylindrical bore of a nut blank the tap is designed to thread. The rate of reduction is preferably such that the bottom wall of the tap thread groove becomes parallel from edge to edge thereof with the axis of the tap in about three turns of the tap thread and before said wall passes inside the projection of bore 18 of the nut blank 19, and preferably also said bottom wall passes inside the projection of bore 18 before the tapered portion of the tap is reached, all as shown more clearly in Figs. 2 and 3 wherein the crest surface portion $18^a$ of the unfinished thread rib is a part of the original cylindrical wall surface of the nut blank bore.

By the arrangement above described it will be observed that in the specific construction described a clearance will exist between the interdental portions of the lands of the tap and the helicoidal surface portion $18^a$ of bore 18 left between adjacent turns of the nut thread rib formed by the nut thread groove cutting teeth of the tap (which are the teeth 16 on the tapered portion of the tap) until the nut thread groove is cut to full depth from edge to edge. It will be further observed that this clearance is taken up as the blank passes on to the non-tapered portion of the tap, and that immediately thereafter the interdental portions of the tap (which have no cutting function until the non-tapered portion of the tap is reached) become effective as nut thread rib crest trimmers or shapers for two or three turns of the tap thread until the thread is completely finished to size and profile, the remaining portion of the tap thread (which may be as short or long as desired) conforming precisely with the finished profile and merely polishing the thread and insuring accuracy of form after dulling of the leading portion of the tap thread having the perfect profile. It will be noted that, as more clearly shown in Fig. 3, the crest finishing will be done in steps, the width of cut gradually diminishing.

In the modified tap shown in Fig. 5, the construction is the same as that described above, and shown in Figs. 1 to 4, except that beginning with interdental portion PP' of the tap, the root of the tap thread approaches the axial line of the tap from edge to edge of the root surface as the entering end of the tap is approached, the root of the thread from end to end of the tap body remaining, however, inclined to the axial line of the tap at the six degree angle. In this construction the crest trimming and shaping also takes place in steps, as will be obvious, the leading top corner of the nut thread rib being first cut away, and the width of cut increasing until the rib is cut entirely across to form the inclined crest surface. The action of the tap is otherwise exactly as in the case of the tap shown in Figs. 1 to 4.

From the foregoing description of the two forms of tap illustrated, it will be observed that, until the top of the nut blank (which is at the left in Figs. 1 and 2) is entered by the non-tapered portion of the tap, the crest of the nut thread rib is not touched or cut by the tap, that the groove is gradually finished to full depth before the crest cutters are reached, and that the crest of the rib is thereafter gradually finished to full size and proper taper before the top of the nut passes the inner end of the threaded body of the tap. The work and stresses are thus advantageously distributed and the thread finished very accurately to proper size and profile.

In the Dardelet self-locking nut, as commonly manufactured, the crest surface of the nut rib is inclined to the axial line of the nut at an angle of six degrees to form the self-holding binding surface portion 21 of the nut thread which wedges upon a similarly inclined bottom or root surface portion 22 of the Dardelet bolt thread when the nut is screwed against the work, as more fully explained in U. S. patent to Dardelet, No. 1,657,244. A Dardelet nut, as commonly manufactured, is shown in Figs. 6 and 7, the top of the nut being at the left in both views, and Fig. 7 being a fragmentary sectional view showing the nut thread jammed and locked on the thread of a complementary Dardelet bolt, the arrows in Fig. 7 indicating the directions of reaction of the work on the bolt and nut.

It is important that the crest size of the Dardelet nut thread rib actually cut by a tap shall conform accurately with the standard size and profile of the thread which the tap is designed for producing, that the angle of the crest surface shall be accurate, and that the crest surface shall be smooth. Taps constructed as above described are well adapted to attain these ends.

By leaving the crest metal untouched and providing a clearance between the same and the interdental portions of the tap until the thread groove is developed full depth and then finishing the crest of the thread rib, not only is the work well distributed, but there is no wear on the helicoidal surface portion $18^a$ of the original bore of the nut blank during development of the nut thread groove to increase the diameter of said portion $18^a$; grinding away and malforming of the nut thread crest by grit or small chips which tend to work in between the crest metal and the bottom of the tap thread groove in taps which trim the crest metal at their entering ends are avoided, since such grit and chips will pass through the clearance space above described, either falling out into the flutes, or being flushed into the flutes by the lubricant stream; and further, the surface $18^a$ is left its original under size and non-tapered profile for reduction to accurate size and contour at substantially the last or inner part of the threaded body of the tap so as to avoid or reduce liability of deformation or marring of the finished crest profile before the nut feeds off on to the shank of the tap.

The tap should preferably have at least one turn of its thread of a profile identical with that of the desired nut or other thread to be cut to insure accuracy of profile after dulling of one or more leading perfect profile thread portions in use, and may have several turns of such a perfect tap thread profile as shown. The employment of one or more turns, preferably several such turns, insures firm and accurate support of the nut until the crest of its thread is finished from end to end, such turns acting as a supporting and feed off screw for the nut.

As heretofore explained, the taps shown are designed for entering the nut blank from the top. It will be obvious that if it be desired to enter the tap from the bottom of the nut, the direction of inclination of the inclined bottom surface portions of the tap thread should be reversed. It will also be evident that changes may be made in the particular construction of the tap within the scope of the invention, that parts of the improvements may be used without the others, that taps or other forms of cutting tools embodying some novel features of the invention may be employed for cutting threads of other styles than the Dardelet thread shown, and that the invention or parts thereof may be embodied in other forms of thread cutting tools than that shown, such as chasers, cutters for die chasers, built-up taps, collapsible and adjustable taps, etc.

What I claim is:

1. A screw thread cutting tap having lands with tapered portions at the entering end of the tap followed by non-tapered portions at the inner ends of the lands, both the tapered and non-tapered portions of the lands being cut by a helical thread groove leaving interdental portions corresponding with the crest profile of the thread designed to be cut on the inner parts of the non-tapered portions of the lands, a series of non-cutting interdental portions on the lands extending a substantial distance inward from the entering end of the tap, and an intermediate series of thread crest profile cutting interdental portions having cutting edge portions progressively receding from the axial line of the tap from the second mentioned series of interdental portions to the first mentioned series of interdental portions.

2. A tap as claimed in claim 1, wherein the tops of the first mentioned series of interdental portions have a slope in one direction toward the axial line of the tap longitudinally of the tap.

3. A tap as claimed in claim 1, wherein the tops of the first mentioned series of interdental portions slope toward the axial line of the tap at a fixed angle from edge to edge of the thread groove, and the bottom of the thread groove from said series of interdental portions toward the entering end of the tap gradually approaches the axial line of the tap, gradually changing the angular relation of a part thereof to the axial line of the tap from one edge of the groove until said groove bottom becomes parallel with said axial line from edge to edge of the groove.

4. A tap as claimed in claim 1, wherein the bottom of the thread groove has a slope toward the axial line of the tap from edge to edge of the groove and gradually approaches the axial line of the tap from said first mentioned series of interdental portions toward the entering end of the tap.

5. A tap for cutting locking screw threads of the Dardelet type, threaded and fluted to provide a helical series of thread groove cutting teeth between the turns of which are located a leading helical series of non-cutting interdental portions, a final helical series of identical cutting interdental portions having their tops sloping throughout their width toward the tap axis in the same direction longitudinally of the tap, and an intermediate helical series of cutting interdental portions having their tops so disposed relatively to the tap axis as to take cuts of progressively varying widths from the crest of a thread rib at an angle to the tap axis corresponding with that of the tops of the final series of cutting interdental portions.

6. A tap as claimed in claim 5, wherein the tops of the non-cutting leading interdental portions are parallel with the tap axis from edge to edge of said portions and the tops of said intermediate series of cutting interdental portions are partly parallel and partly inclined to the tap axis, the width of the parallel part progressively diminishing in the intermediate series of portions and the radial displacement thereof from the tap axis progressively increasing in the order of their approach to the final series of interdental portions.

In testimony whereof I hereunto affix my signature.

ROBERT THOMSON.